US00RE42365E

(19) United States
(12) Reissued Patent
Tsuji

(10) Patent Number: US RE42,365 E
(45) Date of Reissued Patent: May 17, 2011

(54) LIQUID CRYSTAL DISPLAY APPARATUS HAVING DISPLAY PANELS ON BOTH UPPER AND LOWER SURFACES

(75) Inventor: Masaki Tsuji, Kunitachi (JP)

(73) Assignee: Casio Computer Co., Ltd., Tokyo (JP)

(21) Appl. No.: 11/440,403

(22) Filed: May 24, 2006

Related U.S. Patent Documents

Reissue of:
(64) Patent No.: 6,741,301
Issued: May 25, 2004
Appl. No.: 10/334,173
Filed: Dec. 30, 2002

(30) Foreign Application Priority Data

Jan. 10, 2002 (JP) ..... 2002-003122

(51) Int. Cl.
*G02F 1/1345* (2006.01)
*G02F 1/1335* (2006.01)

(52) U.S. Cl. ..... 349/150; 349/65; 349/58; 349/1; 349/74; 349/83; 345/1.1; 455/566

(58) Field of Classification Search ..... 349/149–152
See application file for complete search history.

(56) References Cited

U.S. PATENT DOCUMENTS 4,196,973 A * 4/1980 Hochstrate ..... 349/68
5,587,816 A * 12/1996 Gunjima et al. ..... 349/62
5,625,968 A 5/1997 Ashall
5,742,367 A 4/1998 Kozaki
6,025,897 A * 2/2000 Weber et al. ..... 349/96
6,195,140 B1 * 2/2001 Kubo et al. ..... 349/44
6,473,220 B1 * 10/2002 Clikeman et al. ..... 359/247
6,494,593 B2 12/2002 An et al.
6,621,482 B2 * 9/2003 Fuller ..... 345/102
6,674,496 B2 1/2004 Wei
6,676,268 B2 * 1/2004 Ohkawa ..... 362/613
6,801,271 B2 * 10/2004 Han et al. ..... 349/74
6,981,791 B2 1/2006 Higashiyama
2001/0011029 A1 8/2001 Iwabuchi et al.
2003/0063456 A1 4/2003 Katahira
2005/0073627 A1 4/2005 Akiyama (Continued)

FOREIGN PATENT DOCUMENTS

JP S60-28739 U 2/1985

(Continued)

OTHER PUBLICATIONS

Machine translation of JP 2001-290445.*

*Primary Examiner* — Mark A Robinson
*Assistant Examiner* — Michael Inadomi
(74) *Attorney, Agent, or Firm* — Chen Yoshimura LLP

(57) ABSTRACT

A liquid crystal display apparatus includes a first liquid crystal display panel, a second liquid crystal display panel smaller in area than the first liquid crystal display panel. A flat backlight has an optical waveguide and a point light source placed near one side surface portion of the optical waveguide, and is placed between the first liquid crystal display panel and the second liquid crystal display panel. One reflecting layer is placed at least between the flat backlight and the second liquid crystal display panel.

18 Claims, 11 Drawing Sheets

U.S. PATENT DOCUMENTS

| | | | |
|---|---|---|---|
| 2006/0077687 | A1 | 4/2006 | Higashiyama |

FOREIGN PATENT DOCUMENTS

| | | | |
|---|---|---|---|
| JP | 10-285497 | | 10/1998 |
| JP | 2000-206523 | A | 7/2000 |
| JP | 2001-067049 | A | 3/2001 |
| JP | 2001-215505 | A | 8/2001 |
| JP | 2001-257754 | A | 9/2001 |
| JP | 2001-281653 | A | 10/2001 |
| JP | 2001-290445 | A | 10/2001 |
| JP | 2001-357714 | A | 12/2001 |
| JP | 2002-189230 | A | 7/2002 |
| KR | 2001-35369 | | 5/2001 |
| WO | WO 2003/029884 | A | 4/2003 |

* cited by examiner

LIQUID CRYSTAL DISPLAY APPARATUS HAVING DISPLAY PANELS ON BOTH UPPER AND LOWER SURFACES

Matter enclosed in heavy brackets [ ] appears in the original patent but forms no part of this reissue specification; matter printed in italics indicates the additions made by reissue.

CROSS-REFERENCE TO RELATED APPLICATIONS

This application is based upon and claims the benefit of priority from the prior Japanese Patent Application No. 2002-003122, filed Jan. 10, 2002, the entire contents of which are incorporated herein by reference.

BACKGROUND OF THE INVENTION

1. Field of the Invention

The present invention relates to a liquid crystal display apparatus having display panels on both upper and lower surfaces.

2. Description of the Related Art

For example, as shown in FIG. 12, there is some cell phone designed such that a display portion housing 2 is pivotally attached to an operation key portion housing 1 through a shaft 3. In this case, a key operation portion 4 is formed in the area enclosed with chain lines on the opposite surface of the operation key portion housing 1 to the display portion housing 2. A liquid crystal display apparatus 5 is housed in almost the central portion inside the display portion housing 2.

The display surface of a main liquid crystal display panel 6 is exposed on the opposite surface side of the liquid crystal display apparatus to the operation key portion housing 1. As shown in FIG. 13, when the display portion housing 2 is closed with respect to the operation key portion housing 1, the display surface of a sub liquid crystal display panel 7 smaller in area than the main liquid crystal display panel 6 is exposed on the opposite side to the opposite side of the display portion housing 2 to the operation key portion housing 1.

As described above, there is some cell phone having the liquid crystal display panels 6 and 7 mounted on the two surfaces of the display portion housing 2 pivotally attached to the operation key portion housing 1 through the shaft 3. The sub liquid crystal display panel 7 is used to display the date/time, received contents, the telephone number of the sender, or the like while the display portion housing 2 is closed with respect to the operation key portion housing 1.

FIG. 14 is a sectional view of part of a conventional liquid crystal display apparatus incorporated in such a cell phone. In this liquid crystal display apparatus, the main liquid crystal display panel 6 and sub liquid crystal display panel 7 are placed to oppose each other at a predetermined distance, a main backlight 8 is placed on the opposite side of the main liquid crystal display panel 6 to the display surface side, and a sub backlight 9 is placed on the opposite side of the sub liquid crystal display panel 7 to the display surface side.

The backlights 8 and 9 are of an edge light type. Although not shown in detail, reflectors 12 and 13 are bonded on the opposite sides of these backlights to the opposite sides to the liquid crystal display panels 6 and 7 to which optical waveguides 10 and 11 correspond, and a light source (not shown) such as a fluorescent tube or light-emitting diode is placed near one end face of each of the optical waveguides 10 and 11.

The light emitted from each light source is incident on one end face of each of the optical waveguides 10 and 11. The respective incident light beams are reflected by the reflectors 12 and 13 and two-dimensionally emerge from the opposite surfaces of the optical waveguides 10 and 11 to the liquid crystal display panels 6 and 7. These emerging light beams are incident on the liquid crystal display panels 6 and 7, and image light beams corresponding to the driving operations of the liquid crystal display panels 6 and 7 emerge from the display surface sides of the liquid crystal display panels 6 and 7.

In the conventional liquid crystal display apparatus, since the dedicated backlights 8 and 9 are respectively arranged for the liquid crystal display panels 6 and 7, a large number of components are required, and the thickness of the overall apparatus is large. This leads to an increase in the thickness of the display portion housing 2 of the cell phone.

BRIEF SUMMARY OF THE INVENTION

It is an object of the present invention to provide a liquid crystal display apparatus which can decrease the number of components and the thickness of the overall apparatus.

According to an aspect of the present invention, there is provided a liquid crystal display apparatus comprising a first liquid crystal display panel, a second liquid crystal display panel smaller in area than the first liquid crystal display panel, a flat backlight which has an optical waveguide and a point light source placed near one side surface portion of the optical waveguide, and is placed between the first liquid crystal display panel and the second liquid crystal display panel, and one reflecting layer which is placed at least between the flat backlight and the second liquid crystal display panel.

According to this apparatus, since liquid crystal display panels are placed on the two surfaces of one optical waveguide, the number of components can be decreased, and the thickness of the overall apparatus can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings; which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
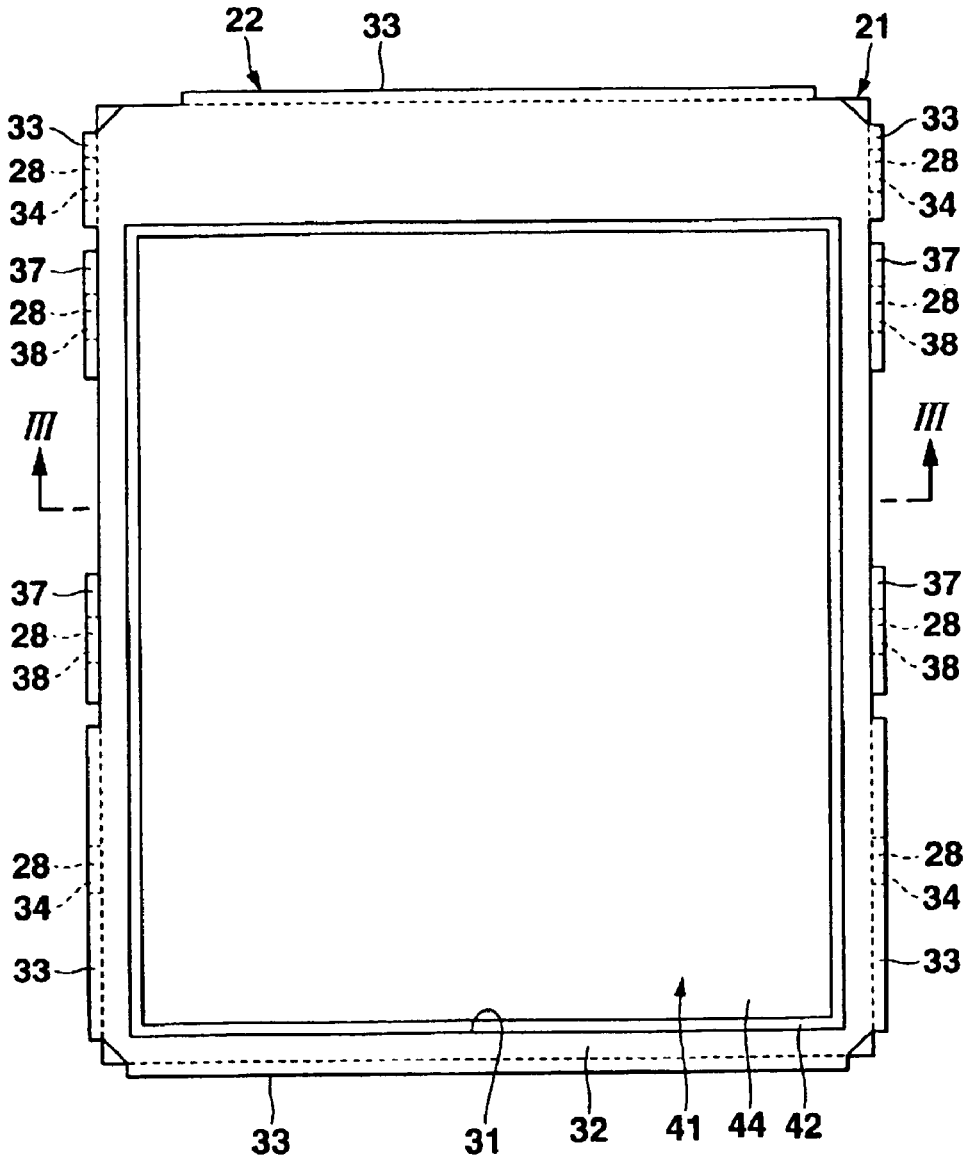
FIG. 1 is a plan view of a liquid crystal display apparatus according to an embodiment of the present invention.
Figure 2:
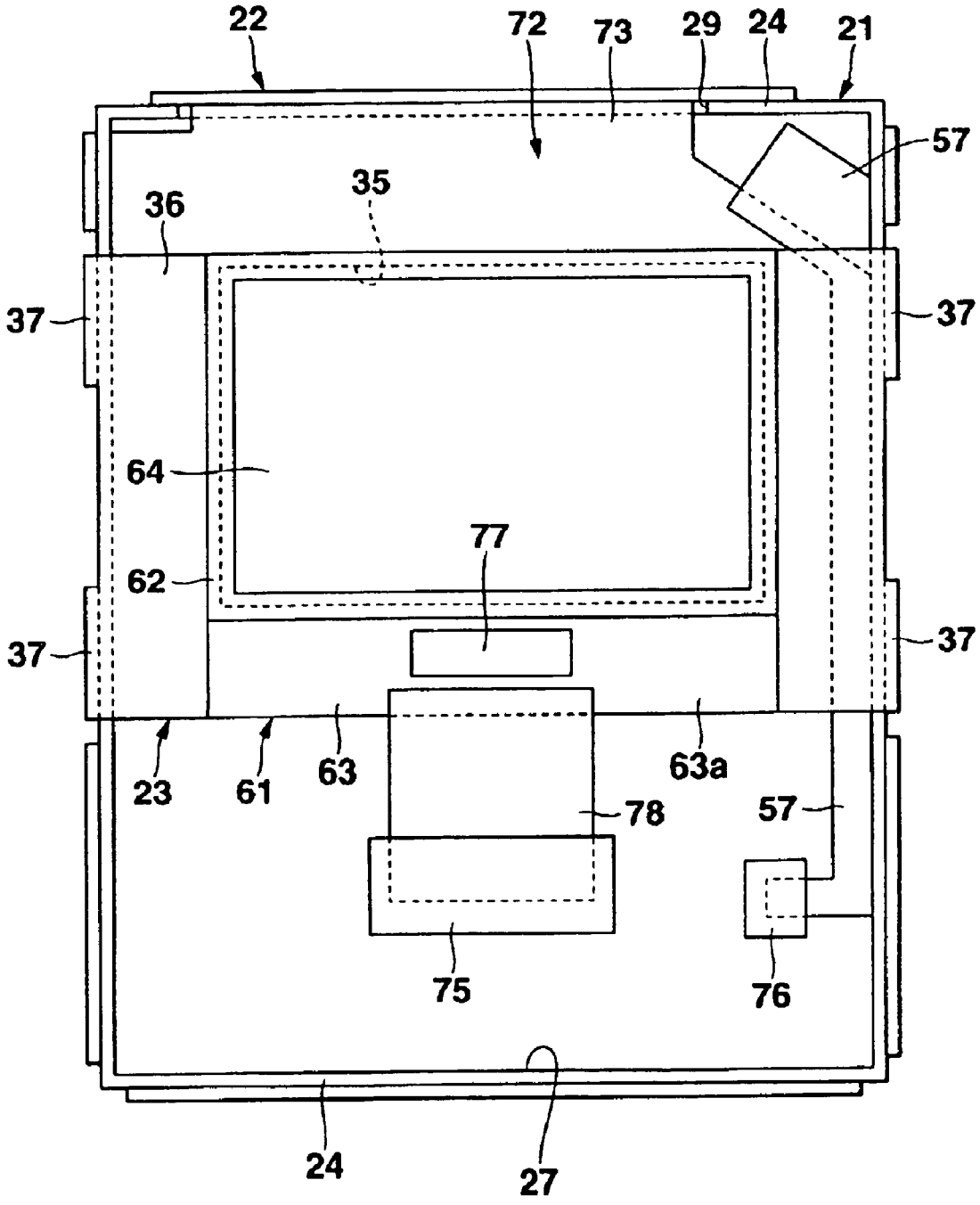
FIG. 2 is a bottom view of the liquid crystal display apparatus in FIG. 1.
Figure 3:
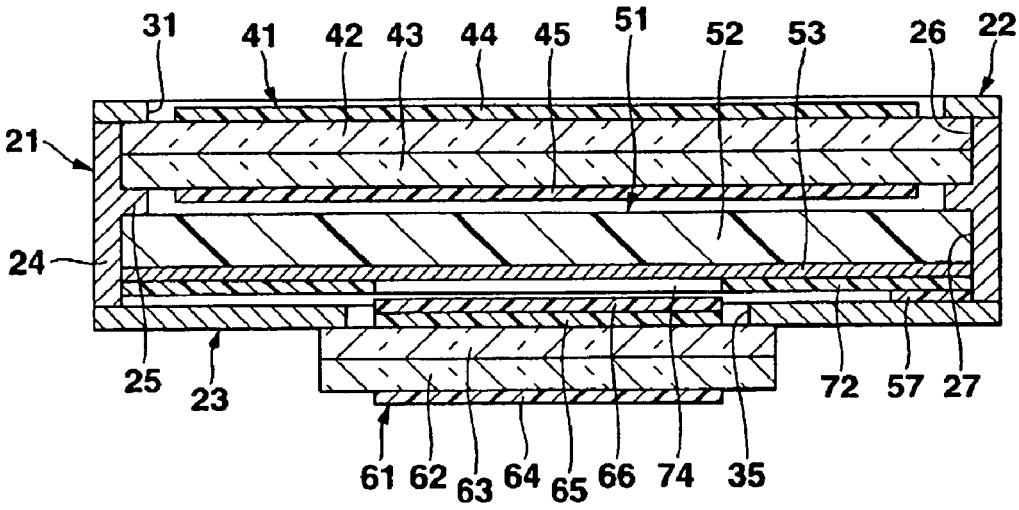
FIG. 3 is a sectional view taken along a line III-III in FIG. 1.
Figure 12:
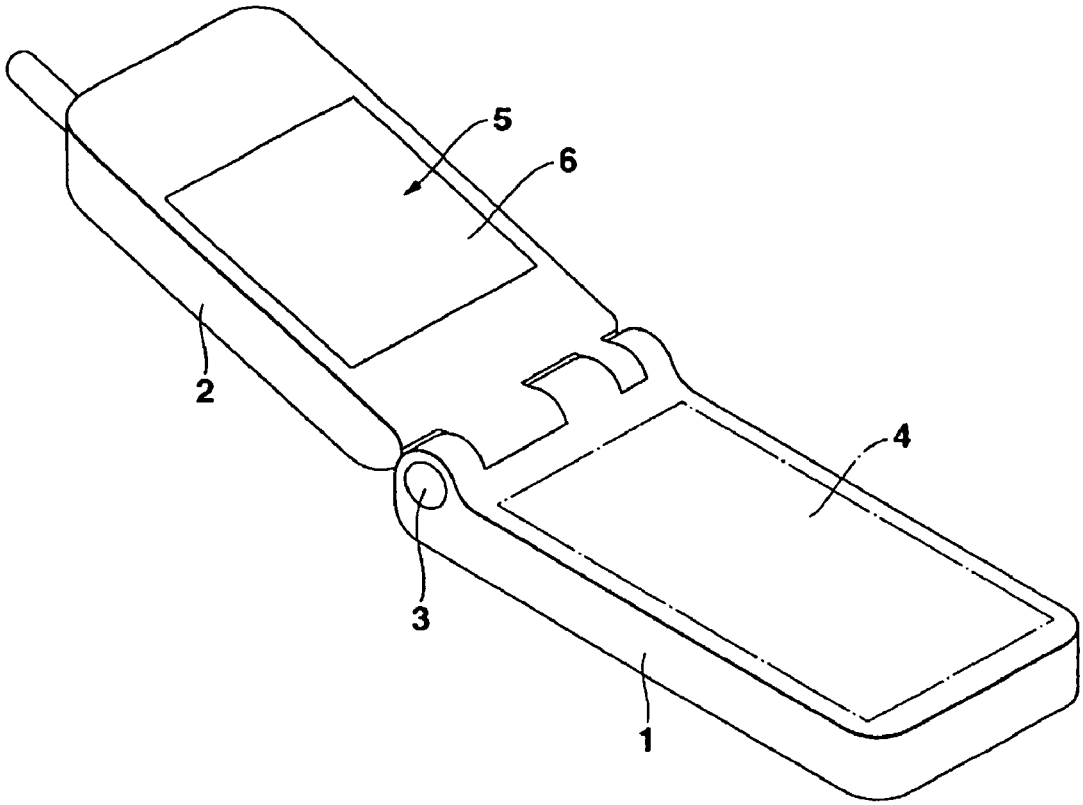
FIG. 12 is a perspective view of an example of a conventional cell phone.

FIG. 1 is a plan view of a liquid crystal display apparatus according to an embodiment of the present invention. FIG. 2 is a bottom view of the apparatus. FIG. 3 is a sectional view taken along a line III-III in FIG. 1. This liquid crystal display apparatus is housed in a display portion housing 2 in FIG. 12 and includes an intermediate case 21, main case 22, and sub case 23.

The intermediate case 21 is made of a resin and has four strip portions 25 (see FIGS. 4 and 6; note that the convex strip portion 25 on the upper side is formed wider to a certain extent than the convex strip portions 25 on the remaining sides in FIGS. 4 and 6) which are integrally connected in the form of a ring protruding inward and located slightly above the middle portion in FIG. 3 in the direction of height of a rectangular frame-like portion 24. A main liquid crystal display panel housing portion 26 is formed on one side of these convex strip portions 25, and a backlight housing portion 27 is formed on the other side. Engaging projection portions 28 (see FIG. 6) are formed at a plurality of predetermined portions of the outer surfaces of the two long side portions of the frame-like portion 24, and a notched portion 29 (see FIG. 6) is formed in a predetermined portion of the outer surface of the upper short side portion of the frame-like portion 24.

The main case 22 is formed from a metal plate and has six side wall portions 33 (one on the upper and lower sides each, and two on the left and right sides each), each corresponding to one of the engaging projection portions 28 of the intermediate case 21, on the four side portions of an almost rectangular frame-like portion 32 having a rectangular opening 31. Each side wall portion 33 of the main case 22 extends in the vertical direction on the drawing surface of FIG. 1, and an engaging hole 34 formed in the extended portion at the middle position thereof is engaged with the corresponding engaging projection portion 28 formed on the intermediate case 21, thus the main case 22 is mounted on the main liquid crystal display panel housing portion 26 of the intermediate case 21.

The sub case 23 is formed from a metal plate smaller than the main case 22 and has four side wall portions 37 (two on the left and right sides each), each corresponding to one of the engaging projection portions 28 of the intermediate case 21, formed on the two short side portions of a rectangular frame-like portion 36 having a rectangular opening 35. In this case, the size of the opening 35 of the sub case 23 is smaller to a certain extent than that of the opening 31 of the main case 22. Each side wall portion 37 of the sub case 23 extends in the vertical direction on the drawing surface of FIG. 1, and an engaging hole 38 formed in the extended portion at the middle position is engaged with the predetermined engaging projection portion 28 of the intermediate case 21, thus the sub case 23 is mounted on the backlight housing portion 27 of the intermediate case 21.

A main liquid crystal display panel 41 is housed in the main liquid crystal display panel housing portion 26 of the intermediate case 21. The main liquid crystal display panel 41 is formed by bonding two transparent substrates 42 and 43, each made of a glass material or the like, through an almost rectangular frame-like seal member (not shown), sealing a liquid crystal (not shown) between the two transparent substrates 42 and 43 inside the seal member, and respectively attached with polarizing plates 44 and 45 on the outer surfaces of the two transparent substrates 42 and 43.

The peripheral portion of the outer surface of the transparent substrate 43 on the opposite side to the display surface side of the main liquid crystal display panel 41 is supported with the convex strip portions 25 of the intermediate case 21. The polarizing plate 44 on the display surface side is placed inside the opening 31 of the main case 22. The peripheral portion of the outer surface of the transparent substrate 42 on the display surface side is pressed against the inner surface of the main case 22 at the outer peripheral portion of the opening 31. In this state, the main liquid crystal display panel 41 is housed in the main liquid crystal display panel housing portion 26 of the intermediate case 21.

A flat backlight 51 is housed in the backlight housing portion 27 of the intermediate case 21. The backlight 51, which will be described in detail later, includes an almost rectangular optical waveguide 52 corresponding in size to the main liquid crystal display panel 41, and a reflector 53 bonded to a predetermined surface (the lower surface in FIG. 3) of the optical waveguide 52.

The backlight 51 is housed in the backlight housing portion 27 while the peripheral portion of the other surface of the optical waveguide 52 is in contact with the convex strip portions 25 of the intermediate case 21. In this case, although described in detail later, a main flexible wiring board 72 and backlight flexible wiring board 57 are arranged between the reflector 53 and the sub case 23.

A sub liquid crystal display panel 61 is placed on the outer side (lower side in FIG. 3) of the opening 35 of the sub case 23 so as to cover the opening. The sub liquid crystal display panel 61 is formed by bonding two transparent substrates 62 and 63 through an almost rectangular frame-like seal member (not shown), sealing a liquid crystal (not shown) between the two transparent substrates 62 and 63 inside the seal member, and respectively attached with polarizing plates 64 and 65 on the outer surfaces of the two transparent substrates 62 and 63. In this case, the size of the sub liquid crystal display panel 61 is smaller to a certain extent than that of the main liquid crystal display panel 41. A color sheet 66, e.g., a blue sheet, is attached to the outer surface of the polarizing plate 65 on the opposite side to the display surface side.

The polarizing plate 65 and the color sheet 66 attached on the outer surface of the polarizing plate 65 are arranged in the opening 35 of the sub case 23. In this state, the peripheral portion defining the outer surface of the transparent substrate 63 on the opposite side to the display surface side is bonded to the outer surface of the outer peripheral portion defining the opening 35 of the sub case 23. In this manner, the sub liquid crystal display panel 61 is placed outside the opening 35 of the sub case 23.

Figure 4:
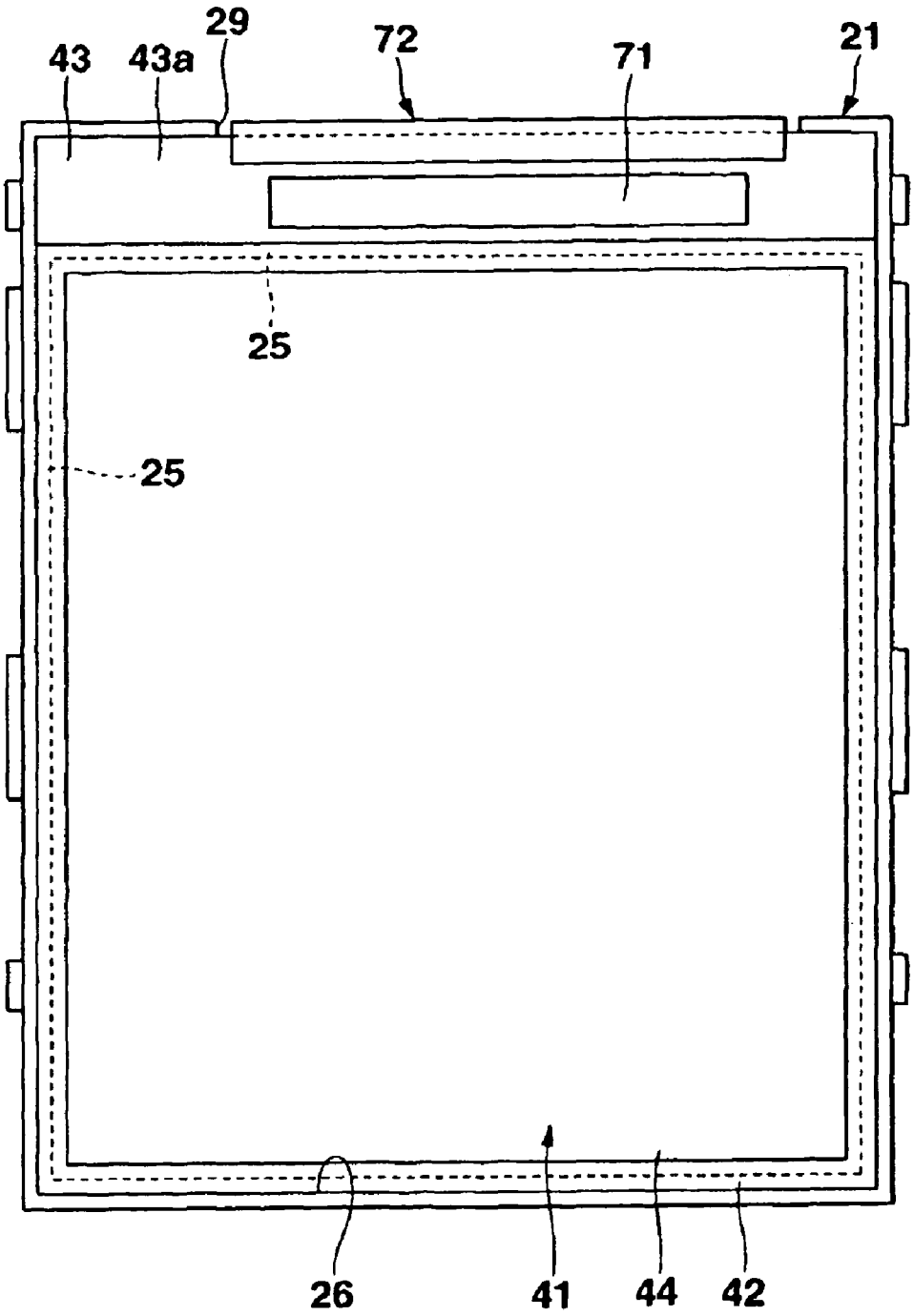
FIG. 4 is a plan view of the apparatus in FIG. 1 from which a main case is removed.

FIG. 4 is a plan view of the apparatus in FIG. 1 from which the main case 22 is removed. The size of a long side of the transparent substrate 43 on the opposite side to the display surface side of the main liquid crystal display panel 41 is larger than that of the transparent substrate 42 on the display surface side, and the upper side portion of the transparent substrate 43 in FIG. 4 protrudes from the transparent substrate 42 to form a protruding portion 43a. One semiconductor chip 71 constituted by an LSI for driving the main liquid crystal panel and the like is mounted on the almost middle portion of the protruding portion 43a on the display surface side.

One end portion of the main flexible wiring board 72 is joined to the protruding end portion of the protruding portion 43a on the display surface side. The main flexible wiring board 72 is bent through almost 180° near one end portion, and a lower portion of main flexible wiring board 72 is placed between the reflector 53 of the backlight 51 and the sub case 23 through the notched portion 29 of the intermediate case 21, as shown in FIG. 3.

Figure 5:
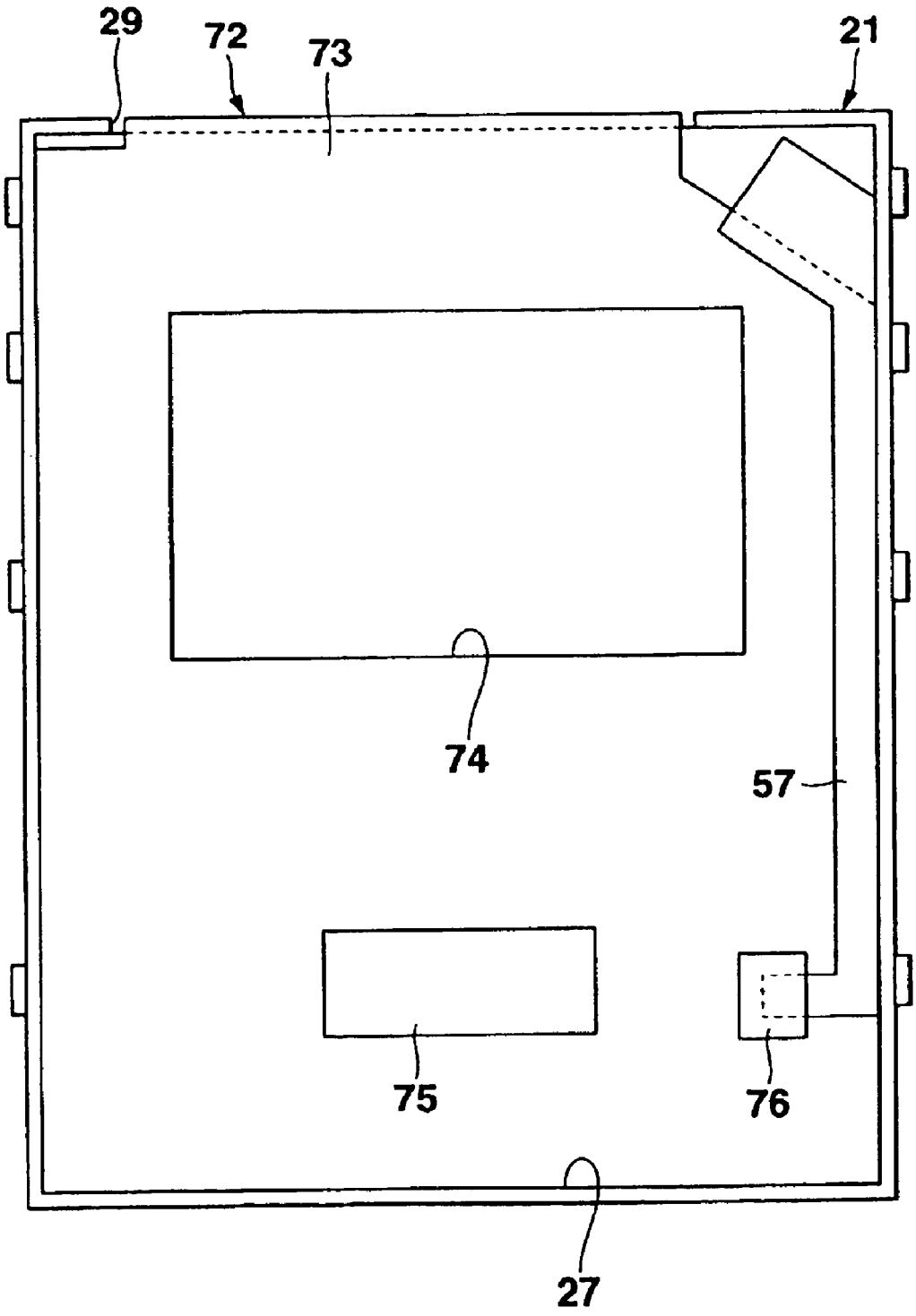
FIG. 5 is a bottom view of the apparatus in FIG. 2 from which the main case, sub case, and sub liquid crystal display panel are removed.

FIG. 5 is a bottom view of the state shown in FIG. 2 from which the main case 22, sub case 23, and sub liquid crystal display panel 61 are removed. The main flexible wiring board 72 has a double-sided wiring structure and includes a lower portion or base film 73 slightly larger than the reflector 53 of the backlight 51. A rectangular opening 74 is formed in a predetermined portion of the base film 73. This opening 74 is smaller than the outer size of the sub liquid crystal display panel 61 but is slightly larger than the area of the two polarizing plates 64 and 65, i.e., the display area of the sub liquid crystal display panel 61.

The opening 74 of the main flexible wiring board 72 is located at a position corresponding to the two polarizing plates 64 and 65 of the sub liquid crystal display panel 61. In this case, since the base film 73 of the main flexible wiring board 72 is placed between the sub liquid crystal display panel 61 and the reflector 53 of the backlight 51, a portion of the reflector 53 which does not correspond to the polarizing plate 65 of the sub liquid crystal display panel 61 is covered with a portion of the main flexible wiring board 72 other than the opening 74.

Referring to FIG. 5, a sub connector 75 and backlight connector 76 are mounted on the upper surface (the opposite surface to the sub liquid crystal display panel 61 as shown in FIG. 2) of the base film 73, and chip components (not shown) such as capacitors and resistors are mounted on other predetermined portions.

As shown in FIG. 2, the size of a long side of the transparent substrate 63 on the opposite side to the display surface side of the sub liquid crystal display panel 61 is larger than that of the transparent substrate 62 on the display surface side, and the lower side portion of the transparent substrate 63 protrudes from the transparent substrate 62 on the display surface side to form a protruding portion 63a. A semiconductor chip 77 constituted by an LSI for driving the sub liquid crystal display panel and the like is mounted on the display surface side of this protruding portion 63a. One end portion of a sub flexible wiring board 78 is joined to the protruding end portion of the protruding portion 63a on the display surface side. The other end portion of the sub flexible wiring board 78 is inserted into the sub connector 75.

Figure 6:
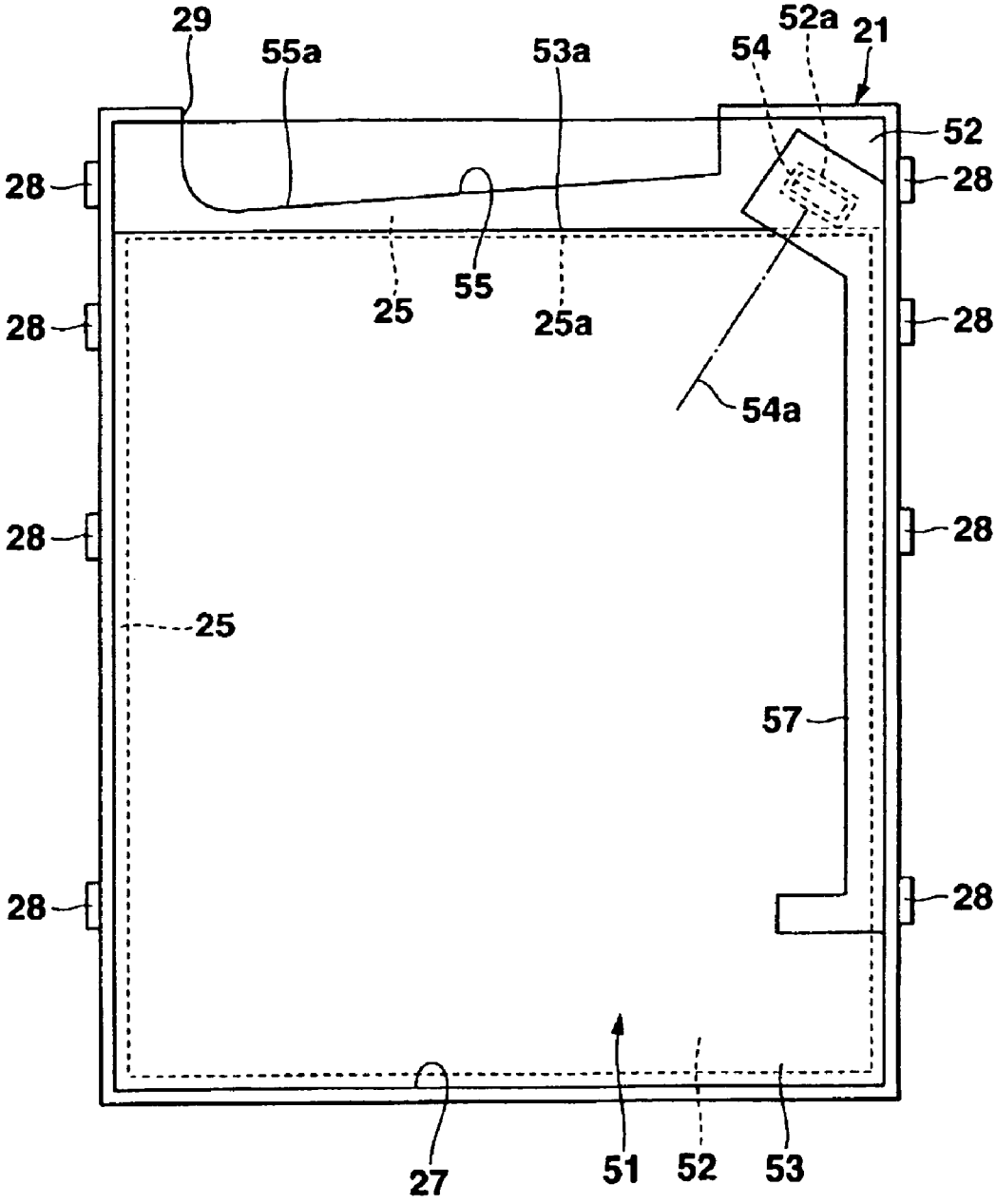
FIG. 6 is a bottom view of the apparatus in FIG. 5 from which the main flexible wiring board is removed.

FIG. 6 is a bottom view of the state shown in FIG. 5 from which the main flexible wiring board 72 is removed. The backlight 51 includes the optical waveguide 52, reflector 53, light-emitting diode (point light source) 54, and backlight flexible wiring board 57. The optical waveguide 52 is made of a transparent resin such as acrylic resin and formed into an almost rectangular plate-like shape having an outer size that makes the optical waveguide be tightly housed in the backlight housing portion 27 of the intermediate case 21. An opening 52a is formed in one corner portion of the optical waveguide 52. The reflector 53 has one side 53a and is smaller in outer size than the optical waveguide 52. The reflector 53 is bonded on one surface of the optical waveguide 52. The opening 52a of the optical waveguide 52 is located outside one side 53a of the reflector 53, and the light-emitting diode 54 is embedded in the opening 52a.

The light-emitting diode 54 is placed such that the normal to the light-emitting surface, i.e., an optical axis 54a, is slightly shifted toward a long side of the optical waveguide 52 near the light-emitting diode 54 with respect to a diagonal line connecting one corner portion of the reflector 53 and a corner portion on the opposite side. That is, the light-emitting diode 54 is located slightly inside from a corner portion of the transparent substrate 42 on the display surface side of the main liquid crystal display panel 41. This makes it possible to reduce the width of the liquid crystal display apparatus. The upper side end (on the side where the light-emitting diode 54 is placed) of the optical waveguide 52 has a notched portion 55 forming an inclined surface 55a that gradually separates from the short side of the optical waveguide 52 with an increase in distance from the light-emitting diode 54. Since light emitted from the light-emitting diode 54 is partly reflected by the inclined surface 55a and incident on the optical waveguide 52, an increase in brightness can be attained as a whole. Almost the entire portion of the intermediate case 21 is formed into a frame-like shape, and a portion corresponding to the notched portion 55 of the optical waveguide 52, i.e., an inside surface 25a of the strip portions 25, is located inward from the deepest portion of the notched portion 55 to cover the entire notched portion 55 of the optical waveguide 52. This prevents the light emitted from the light-emitting diode 54 from leaking outside the main liquid crystal display panel 41.

At a predetermined corner portion of the optical waveguide 52, one end portion of the backlight flexible wiring board 57 having an almost strip-like shape is connected and joined to the light-emitting diode 54. As shown in FIG. 5, the backlight flexible wiring board 57 is placed on the outer surface side of the main flexible wiring board 72, and the other end portion of the backlight flexible wiring board 57 is inserted into the backlight connector 76.

In this liquid crystal display apparatus, when the main liquid crystal display panel 41 is to be used, the light-emitting diode 54 is turned on, and the light emitted from the light-emitting diode 54 is incident on the optical waveguide 52 through the inner surface of the opening 52a formed in one corner portion of the optical waveguide 52. This incident light is reflected by the reflector 53 and two-dimensionally emerges from the opposite surface of the optical waveguide 52 to the main liquid crystal display panel 41. The main liquid crystal display panel 41 is irradiated with this emerging light, and image light corresponding to the driving operation of the main liquid crystal display panel 41 emerges from the display surface side of the main liquid crystal display panel 41.

When the sub liquid crystal display panel 61 is to be used, the light-emitting diode 54 is turned off, and external light is used. That is, external light is transmitted through the sub liquid crystal display panel 61, the color sheet 66, and the opening 74 of the main flexible wiring board 72 and then reflected by the reflector 53. The reflected light is transmitted through the opening 74 of the main flexible wiring board 72 and the color sheet 66. The sub liquid crystal display panel 61 is irradiated with the transmitted light, and image light corresponding to the driving operation of the sub liquid crystal display panel 61 emerges from the display surface side of the sub liquid crystal display panel 61. In this case, the image light emerging from the display surface side of the sub liquid crystal display panel 61 has a color (e.g., blue) corresponding to the color sheet 66.

Figure 13:
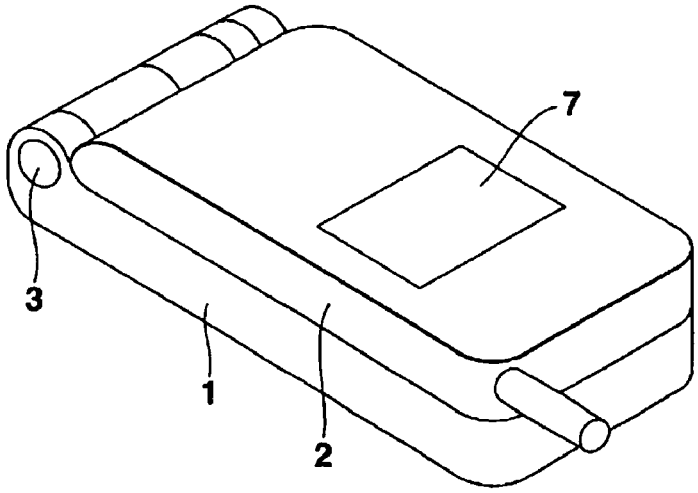
FIG. 13 is a perspective view showing the display portion housing of the cell phone in FIG. 12 in a closed state.
Figure 14:
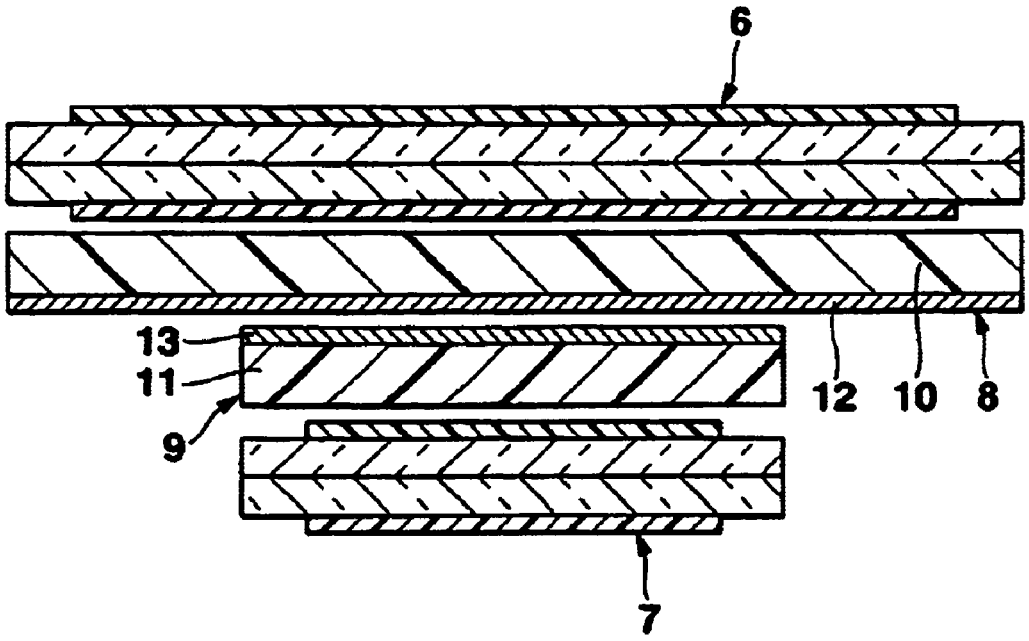
FIG.14 PRIOR ART
FIG. 14 is a sectional view of part of an example of a conventional liquid crystal display apparatus incorporated in the cell phone shown in FIGS. 12 and 13.

In this manner, in this liquid crystal display apparatus, the liquid crystal display panels 41 and 61 are placed on the opposite surface sides of the optical waveguide 52 having the reflector 53 mounted on the predetermined surface, and the main liquid crystal display panel 41 is used as a transmission type panel, while the sub liquid crystal display panel 61 is used as a reflection type panel. This allows only one backlight 51 to be placed between both liquid crystal display panels 41 and 61. This makes it possible to decrease the number of components and thickness of the overall apparatus. As a consequence, when this liquid crystal display apparatus is incorporated in a cell phone like the one shown in FIGS. 12 and 13, a reduction in the thickness of the display portion housing 2 can be attained.

In addition, in this liquid crystal display apparatus, the main flexible wiring board 72 is placed between the sub liquid crystal display panel 61 and the reflector 53, and the portion of the reflector 53 which does not correspond to the polarizing plate 65 of the sub liquid crystal display panel 61 is covered with the portion of the main flexible wiring board 72 other than the opening 74. Even if, therefore, external light enters through the opening 35 of the sub case 23 around the polarizing plate 65 of the sub liquid crystal display panel 61, this external light can be absorbed by the main flexible wiring board 72. The main flexible wiring board 72 can therefore be made to have the function of a light-shielding film. This makes it possible to reliably prevent unnecessary light leakage through the opening 35 of the sub case 23 around the polarizing plate 65 of the sub liquid crystal display panel 61.

The above embodiment has exemplified the case wherein a total reflection type reflector is used as the reflector 53. If, however, a translucent reflector is used as the reflector 53, the sub liquid crystal display panel 61 can be used as both a transmission type and a reflection type.

Assume that the reflector denoted by reference numeral 53 in FIG. 3 serves as a translucent reflector. In this case, while the light-emitting diode 54 is OFF, external light from the display surface side of the sub liquid crystal display panel 61 is transmitted through the sub liquid crystal display panel 61 and color sheet 66 and partly reflected by the reflector 53. This light is then transmitted through the color sheet 66 again and emerges to the display surface side of the sub liquid crystal display panel 61, thereby realizing reflection type display of a color (e.g., blue) corresponding to the color sheet 66.

While the light-emitting diode 54 is ON, the light emitted from the light-emitting diode 54 is incident through the inner surface of the opening 52a of the optical waveguide 52, travels in the optical waveguide 52, and is transmitted through the reflector 53. This transmitted light is transmitted through the opening 74 of the main flexible wiring board 72 and the color sheet 66. The sub liquid crystal display panel 61 is irradiated with this transmitted light, and image light corresponding to the driving operation of the sub liquid crystal display panel 61 emerges from the display surface side of the sub liquid crystal display panel 61. As a consequence, the sub liquid crystal display panel 61 performs transmission type display. In this case as well, the image light emerging from the display surface side of the sub liquid crystal display panel 61 has a color corresponding to the color sheet 66.

When the main liquid crystal display panel 41 is to be used, the light emitted from the light-emitting diode 54 is incident through the inner surface of the opening 52a of the optical waveguide 52, travels in the optical waveguide 52, and is partly reflected by the translucent reflector 53. This light then emerges to the main liquid crystal display panel 41 side. When the main liquid crystal display panel 41 is used, reflection type display can be performed. However, external light from the display surface side of the main liquid crystal display panel 41 travels in the direction of thickness of the optical waveguide 52, is partly reflected by the reflector 53, and emerges to the display surface side of the main liquid crystal display panel 41. In this case, since a shade corresponding to the thickness of the optical waveguide 52 is cast on a display image, the thickness of the waveguide 52 is preferably minimized.

The optical waveguide 52 and translucent reflector 53 are almost equal in size to the main liquid crystal display panel 41 and larger than the sub liquid crystal display panel 61. For this reason, light is also transmitted through the translucent reflector 53 even at a position around the polarizing plate 65 of the sub liquid crystal display panel 61.

As described above, however, since the main flexible wiring board 72 is placed between the sub liquid crystal display panel 61 and the reflector 53, and the portion of the reflector 53 which does not correspond to the sub liquid crystal display panel 61 is covered with the portion of the main flexible wiring board 72 other than the opening 74, even if light is transmitted through the reflector 53 at a position around the polarizing plate 65 of the sub liquid crystal display panel 61, the transmitted light can be absorbed by the main flexible wiring board 72. In this case as well, therefore, the main flexible wiring board 72 can be made to have the function of a light-shielding film. This makes it possible to reliably prevent unnecessary light leakage through the opening 35 of the sub case 23 around the polarizing plate 65 of the sub liquid crystal display panel 61.

Figure 7:
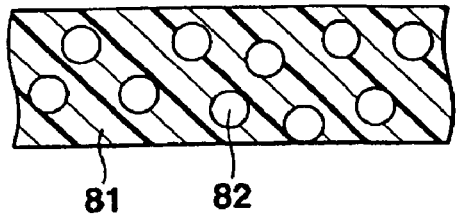
FIG. 7 is an enlarged sectional view of part of the first example of a translucent reflector.
Figure 8:
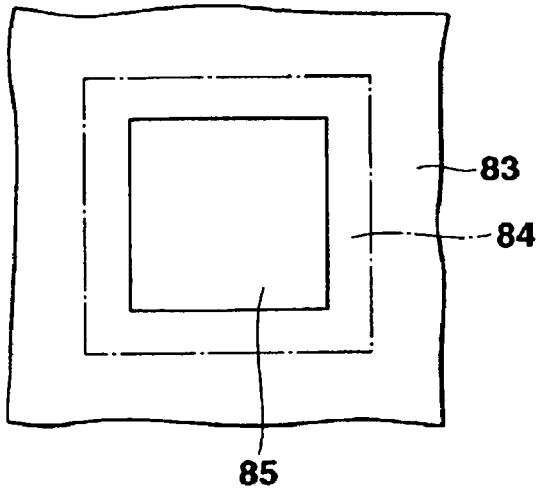
FIG. 8 is an enlarged sectional view of part of the second example of a translucent reflector.
Figure 9:
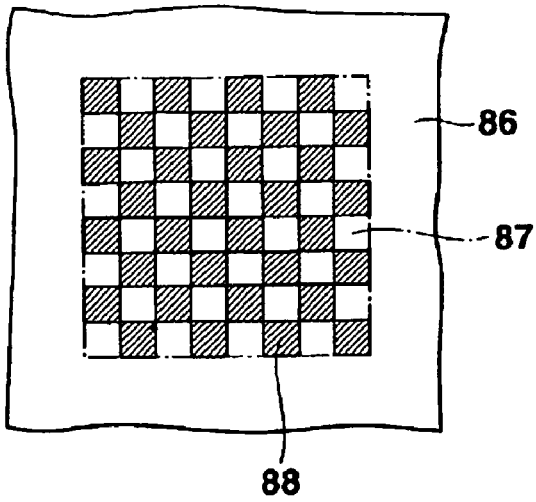
FIG. 9 is an enlarged sectional view of part of the third example of a translucent reflector.

As a translucent reflector, as shown in FIG. 7, a plate obtained by dispersing reflecting particles 82 in a transparent resin plate 81 may be used. Alternatively, as shown in FIG. 8, a plate obtained by forming one reflecting layer 85 made of aluminum, silver, or the like on one surface of a transparent resin plate 83 in correspondence with one pixel 84 indicated by chain lines may be used. In this case, the area of the reflecting layer 85 is 30 to 70% of the area of one pixel 84. Alternatively, as shown in FIG. 9, a plate obtained by forming a plurality of dotted reflecting layers 88 made of aluminum, silver, or the like on one surface of a transparent resin plate 86 for one pixel 87 indicated by a chain line may be used. In this case, the total area of the plurality of reflecting layers 88 is 30 to 70% of the area of one pixel 87. Furthermore, translucent reflectors may be placed on the opposite surfaces of the optical waveguide 52. In this case, reflection type display and transmission type display can be done on both the main liquid crystal display panel and the sub liquid crystal display panel under almost the same conditions.

Instead of a dedicated reflector, a reflecting layer made of aluminum, silver, or the like may be formed on one surface of the optical waveguide 52 by vapor deposition, sputtering, or the like. Alternatively, instead of a dedicated translucent reflector, one or a plurality of dotted reflecting layers may be formed on one or two surfaces of the optical waveguide 52 with respect to one pixel by properly patterning a reflecting layer made of aluminum, silver, or the like formed by vapor deposition, sputtering, or the like.

In addition, only the optical waveguide 52 may be placed between the main liquid crystal display panel 41 and the sub liquid crystal display panel 61. In this case, however, both liquid crystal display panels 41 and 61 are of an active matrix type, with one pixel being constituted by a transmitting portion and reflecting portion.

Figure 10A:
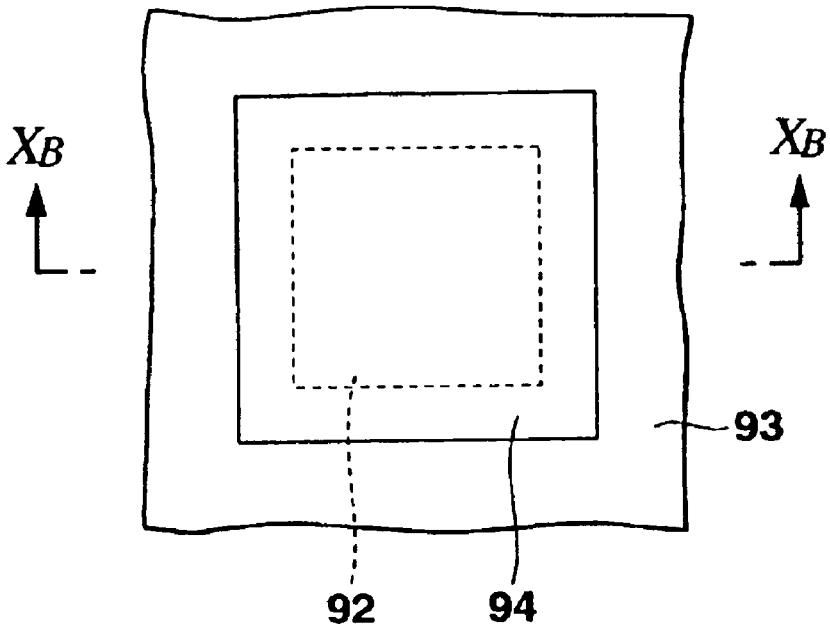
FIG. 10A is an enlarged plan view of an example of a portion corresponding to one pixel without any dedicated reflector.
Figure 10B:
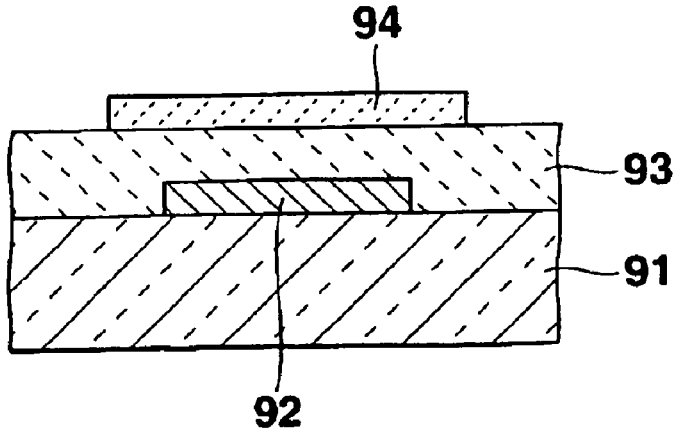
FIG. 10B is an enlarged sectional view taken along a line $X_B$-$X_B$ in FIG. 10A.

For example, as shown in FIGS. 10A and 10B, a reflecting layer 92 made of aluminum, silver, or the like is formed on the upper surface (the opposite surface to the transparent substrates 42 and 62 in FIG. 3) of a transparent substrate 91 corresponding to the transparent substrates 43 and 63 in FIG. 3. An insulating film 93 is formed on the entire upper surface, and a pixel electrode 94 made of ITO is formed on the upper surface of the insulating film 93. In this case, the area of the reflecting layer 92 is 30 to 70% of the area of the pixel electrode 94. In one pixel, the reflecting layer 92 forms a reflecting portion, and a portion of the pixel electrode 94 which does not overlap with the reflecting layer 92 forms a transmitting portion.

Figure 11A:
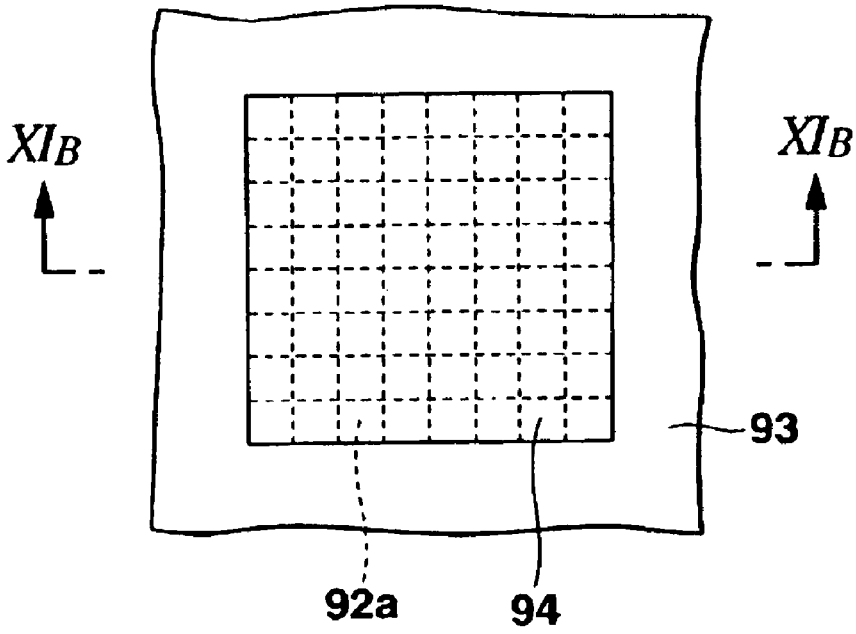
FIG. 11A is an enlarged sectional view of another example of a portion corresponding to one pixel without any dedicated reflector.
Figure 11B:
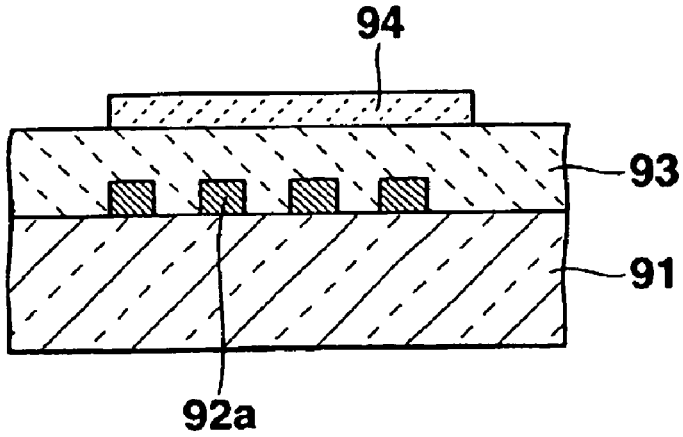
FIG. 11B is an enlarged sectional view taken along a line $XI_B$-$XI_B$ in FIG. 11A.

Alternatively, as shown in FIGS. 11A and 11B, a plurality of dotted reflecting layers 92a may be formed for one pixel electrode 94. In this case, the total area of the plurality of reflecting layers 92a is 30 to 70% of the area of the pixel electrode 94. In one pixel, the plurality of reflecting layers 92a form reflecting portions, and a portion of the pixel electrode 94 which does not overlap with the reflecting layers 92a form transmitting portions.

In the arrangement shown in FIGS. 10A and 10B or 11A and 11B, only one optical waveguide 52 is placed between the main liquid crystal display panel 41 and the sub liquid crystal display panel 61, and hence a reflector or translucent reflector becomes unnecessary. The number of components can be reduced accordingly, and the thickness of the overall apparatus can be reduced.

In addition, the above embodiment has exemplified the structure in which the point light source formed from a light-emitting diode is embedded in the optical waveguide. However, an inclined surface (serving as a light incident surface) may be formed to extend across two sides adjacent to a corner portion (one or a plurality of portions) of the optical waveguide, and a point light source may be placed near the inclined surface. The above embodiment has exemplified the case wherein the point light source formed from a light-emitting diode is used. However, the present invention is not limited to this, and a line light source such as a fluorescent lamp may be used. In this case, the line light source may be placed near one side of the optical waveguide. In addition, the above embodiment has exemplified the case wherein the backlight having the optical waveguide is used as a flat backlight. However, the present invention is not limited to this, and a flat light-emitting device such as an EL (electroluminescence) panel may be used.

As has been described above, according to the present invention, since the liquid crystal display panels are placed on the two surface sides of one optical waveguide, the number of components can be reduced, and the thickness of the overall apparatus can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:

a first liquid crystal display panel;

a second liquid crystal display panel smaller in *display* area than the first liquid crystal display panel;

a flat backlight which has an optical waveguide and a point light source placed near one side surface portion of the optical waveguide, and is placed between and illuminates the first liquid crystal display panel and the second liquid crystal display panel; [and]

one reflecting layer which is placed at least between the flat backlight and the second liquid crystal display panel*; and*

*a flexible wiring board disposed between said second liquid crystal display panel and said one reflecting layer, said flexible wiring board being connected to said first liquid crystal display panel and having an opening corresponding to said display area of said second liquid crystal display panel*.

2. An apparatus according to claim 1, wherein the reflecting layer includes a total reflection type reflecting layer.

3. An apparatus according to claim 1, wherein the reflecting layer includes a translucent reflecting layer.

4. An apparatus according to claim 3, wherein the translucent reflecting layer includes a transparent resin and a reflecting member.

5. An apparatus according to claim 4, wherein an area of the reflecting member included in the translucent reflecting layer is 30 to 70% of an area of one pixel.

6. An apparatus according to claim 1, wherein a size of the optical waveguide is substantially equal to a size of the first liquid crystal display panel.

7. An apparatus according to claim 1, [which further comprises a] *wherein*

*the* flexible wiring board *is* connected to the [first and] second liquid crystal display panel[s, and placed between the reflecting layer and the second liquid crystal display panel].

8. An apparatus according to claim [7] *1*, wherein *said opening of* the flexible wiring board [has an opening corresponding to] *coincides with said display area of* the second liquid crystal display panel.

9. An apparatus according to claim 8, wherein a size of the opening of the flexible wiring board is [smaller] *larger* than a size of *the display area of* the second liquid crystal display panel *and is smaller than a size of a display area of the first liquid crystal display panel*.

10. An apparatus according to claim 1, wherein the optical waveguide has a substantially rectangular shape, and the point light source is placed on a short-side side near one corner portion of the optical waveguide.

11. An apparatus according to claim 10, wherein the point light source is placed such that an optical axis thereof is slightly shifted toward a long side of the optical waveguide near the point light source with respect to diagonal line connecting one corner portion of the optical waveguide and a corner portion on an opposite side thereto.

12. An apparatus according to claim 10, wherein a short side portion of the optical waveguide near the point light source has a notched portion forming an inclined surface that gradually separates from a short side with distance from the point light source.

13. An apparatus according to claim 1, wherein the optical waveguide has an opening, and the point light source is placed inside the opening.

14. An apparatus according to claim 1, which further comprises a backlight flexible wiring board connected to the point light source, and placed between the reflecting layer and the second liquid crystal display panel.

15. An apparatus according to claim 1, further comprising a case, the case having a liquid crystal display panel housing portion which houses the first liquid crystal display panel and a backlight housing portion which houses the backlight.

16. An apparatus according to claim 15, wherein the case has an intermediate case having the liquid crystal display panel housing portion and the backlight housing portion, and a pair of metal plate cases placed on upper and lower surfaces of the intermediate case.

17. An apparatus according to claim 16, wherein one of the metal plate cases has an opening corresponding to the second liquid crystal display panel.

18. An apparatus according to claim 17, wherein the second liquid crystal display panel is placed outside one of the metal plate cases.

[19. A liquid crystal display apparatus comprising:

a first liquid crystal display panel;

a second liquid crystal display panel smaller in area than the first liquid crystal display panel;

a flat backlight placed between the first liquid crystal display panel and the second liquid crystal display panel; and a translucent reflecting layer placed between the flat backlight and the second liquid crystal display panel.]

[20. An apparatus according to claim 19, wherein the flat backlight includes an optical waveguide, and the translucent reflecting layer is formed on the optical waveguide.]

[21. A liquid crystal display apparatus comprising:

a first liquid crystal display panel;

a second liquid crystal display panel smaller in area than the first liquid crystal display panel; and a flat backlight which has an optical waveguide and a point light source placed near one side surface portion of the optical waveguide, and is placed between the first liquid crystal display panel and the second liquid crystal display panel, wherein the first liquid crystal display panel has a translucent reflecting layer including a reflecting layer and a transparent pixel electrode, and the second liquid crystal display panel has a translucent reflecting layer including a reflecting layer and a transparent pixel electrode.]

[22. An apparatus according to claim 21, wherein an area of at least one of the reflecting layers is 30 to 70% of an area of the transparent pixel electrode.]

* * * * *